(12) United States Patent
Syamoto et al.

(10) Patent No.: US 6,659,255 B2
(45) Date of Patent: Dec. 9, 2003

(54) SHIFT LOCK DEVICE

(75) Inventors: Noriyasu Syamoto, Aichi (JP); Isamu Matsushima, Aichi (JP)

(73) Assignee: Kabushiki Kaisha Tokai Rika Denki Seisakusho (JP)

( * ) Notice: Subject to any disclaimer, the term of this patent is extended or adjusted under 35 U.S.C. 154(b) by 0 days.

(21) Appl. No.: 10/100,287

(22) Filed: Mar. 18, 2002

(65) Prior Publication Data

US 2002/0166400 A1 Nov. 14, 2002

(30) Foreign Application Priority Data

Mar. 19, 2001 (JP) .......................................... 2001-078358

(51) Int. Cl.[7] ................................................ F16H 59/10
(52) U.S. Cl. .................................................... 192/220.4
(58) Field of Search .......................... 192/220.4, 220.2, 192/220.3, 220.5, 220.6, 220.7; 74/473.33, 471 XY, 473.21, 473.22, 473.23; 477/96

(56) References Cited

U.S. PATENT DOCUMENTS 2,900,836 A * 8/1959 Gleeson et al. ............... 74/469
5,458,021 A * 10/1995 Wichelt et al. ............... 74/536
5,588,934 A * 12/1996 Osborn et al. ................. 477/96
5,695,029 A * 12/1997 Yokoyama et al. ......... 192/219.6
6,009,769 A * 1/2000 Ikegami .................... 74/473.23

FOREIGN PATENT DOCUMENTS

JP  7-20460   4/1995
JP  10-059132  3/1998

\* cited by examiner

*Primary Examiner*—Saul Rodriguez
(74) *Attorney, Agent, or Firm*—Patterson, Thuente, Skaar & Christensen, P.A.

(57) ABSTRACT

A shift lock device for a shift lever of a shift apparatus includes a fixed plate having a shift gate that allows movement of the shift lever to each of the shift positions. A movable plate faces the fixed plate and is movable in a direction intersecting a moving direction of shift lever. The movable plate has a corresponding gate that has an area greater than the area of the shift gate. A solenoid is connected to the movable plate to move the movable plate between a first position and a second position. The corresponding gate of the movable plate allows movement of the shift lever to any shift position at the first position and restricts movement of the shift lever in cooperation with the fixed plate at the second position.

10 Claims, 3 Drawing Sheets

SHIFT LOCK DEVICE

BACKGROUND OF THE INVENTION

The present invention relates to a shift lock device and, more specifically, to a shift lock device of a shift-by-wire type shift apparatus.

Conventionally, a driver of a vehicle designates a shift position in an automatic transmission by operating a shift lever of a shift apparatus. A shift lock device locks the shift lever in a park position (parking) so as to restrict movement to another position. The lock is released by, for example, operating a brake pedal. For example, Japanese Laid-Open Patent Publication No. 10-59132 discloses a shift lever apparatus that moves back and forth in a linear shift gate. The park position is located on one end of the shift gate. When the shift lever moves to the park position, a lock pin of an actuator (solenoid) engages a projection formed on the shift lever to lock the shift lever.

For example, if an ignition switch ON output signal and a brake pedal operation output signal are sent to an electronic control unit (ECU) and a lock release button is pressed, the actuator is driven to disengage the lock pin from the projection. The shift lever may then be moved from the park position P to a reverse position R, a neutral position N, or a drive position D.

Japanese Laid-Open Utility Model Publication No. 7-20460 discloses a shift lever apparatus provided with a restriction mechanism that restricts movement of a shift lever from the neutral position N to the reverse position R to prevent the shift lever from being moved from the drive position D to the reverse position R.

A shift lever apparatus is provided with a switch that detects movement of the shift lever and a solenoid that operates in response to a detection signal from the switch. When the vehicle velocity is less than a predetermined value, the shift lever is movable from the neutral position N to the reverse position R. When the vehicle velocity exceeds the predetermined value, the solenoid moves an engaging member to engage the anchor member and the shift lever with each other and restrict the movement of the shift lever from the neutral position N to the reverse position R.

In recent years, a so-called shift-by-wire automatic transmission has been proposed in which a switching operation of a shift lever is converted into an electrical switching signal to operate an actuator with the switching signal and switch a manual shift valve. In the shift-by-wire automatic transmission, the shift lever may be operated with a small amount of force, and the shift range may easily be switched by an electrical switching signal. Moreover, the shift lever and shift apparatus may be reduced in size.

In the shift-by-wire automatic transmission, as the sizes of the shift lever and shift apparatus are reduced, it becomes necessary to reduce the size of the actuator, which locks the shift lever. However, if the size of the actuator is reduced too much, it becomes difficult for the actuator to have sufficient strength for restricting the movement of the shift lever. Moreover, the mechanical structure for restricting the movement of the shift lever from the neutral position N to the reverse position R is complicated, and it is also difficult for the size of this structure to be reduced.

Furthermore, the actuator is used only to restrict movement of the shift lever from the park position P. Accordingly, a separate actuator is needed to restrict movement from the neutral position N to the reverse position R.

SUMMARY OF THE INVENTION

It is a first object of the present invention to provide a shift lock device that can be reduced in size.

It is a second object of the present invention to provide a shift lock device that locks a shift lever in a park position and restricts movement of the shift lever from the neutral position to the reverse position with a single actuator.

In a first perspective of the present invention, a shift lock device for a shift lever that selects shift positions in a shift apparatus used in an automatic transmission of a vehicle is provided. The shift lock device includes a fixed plate having a shift gate that allows movement of the shift lever to each of the shift positions and a movable plate facing the fixed plate and being movable in a direction intersecting a moving direction of shift lever. The movable plate has a corresponding gate that has an area greater than the area of the shift gate. An actuator is connected to the movable plate to move the movable plate between a first position and a second position. The corresponding gate of the movable plate allows movement of the shift lever to any shift position at the first position and restricts movement of the shift lever in cooperation with the fixed plate at the second position.

In a second perspective of the present invention, a shift lock device for a shift lever that selects shift positions including a park position, a neutral position, and a drive position in a shift apparatus used in an automatic transmission of a vehicle is provided. The shift lock device includes a fixed plate having a shift gate that allows movement of the shift lever to each of the shift positions. The shift gate has a first crank-shaped opening, which corresponds to the park position, and a linear opening, which corresponds to the neutral position and the drive position and which is formed continuously from the first crank-shaped opening. A movable plate faces the fixed plate and is movable in a direction intersecting a direction in which the shift lever moves. The movable plate includes a first crank-shaped opening and a corresponding gate, which is formed continuously from the first crank-shaped opening and is wider than the linear opening. An actuator is connected to the movable plate to move the movable plate between a first position and a second position. The corresponding gate of the movable plate allows movement of the shift lever to any shift position at the first position, At the second position, the first and second crank-shaped openings lock the shift lever in the park position, and the linear opening and part of the wide opening restrict movement of the shift lever between the drive position and the neutral position.

DETAILED DESCRIPTION OF THE PREFERRED EMBODIMENTS

Figure 1:
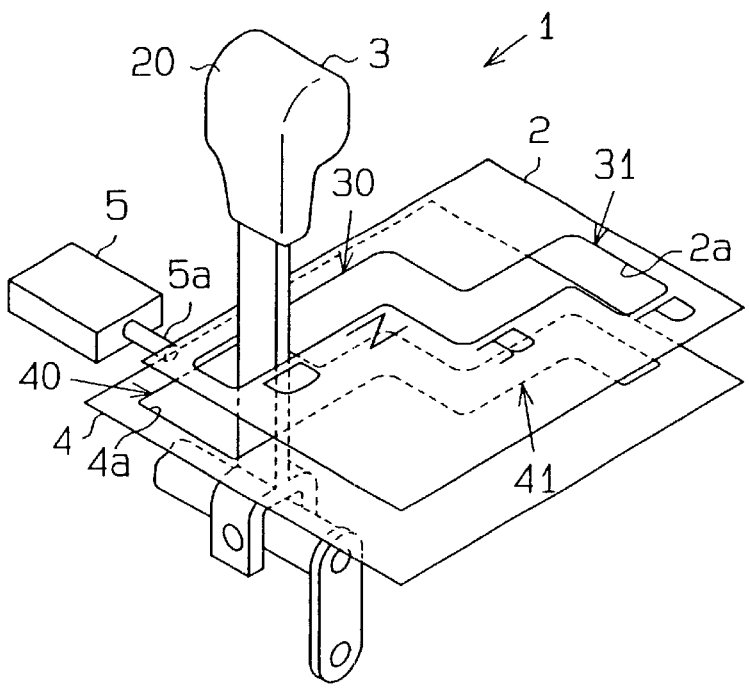
FIG. 1 is a schematic perspective view of a shift lock device of the present invention.
Figure 2:
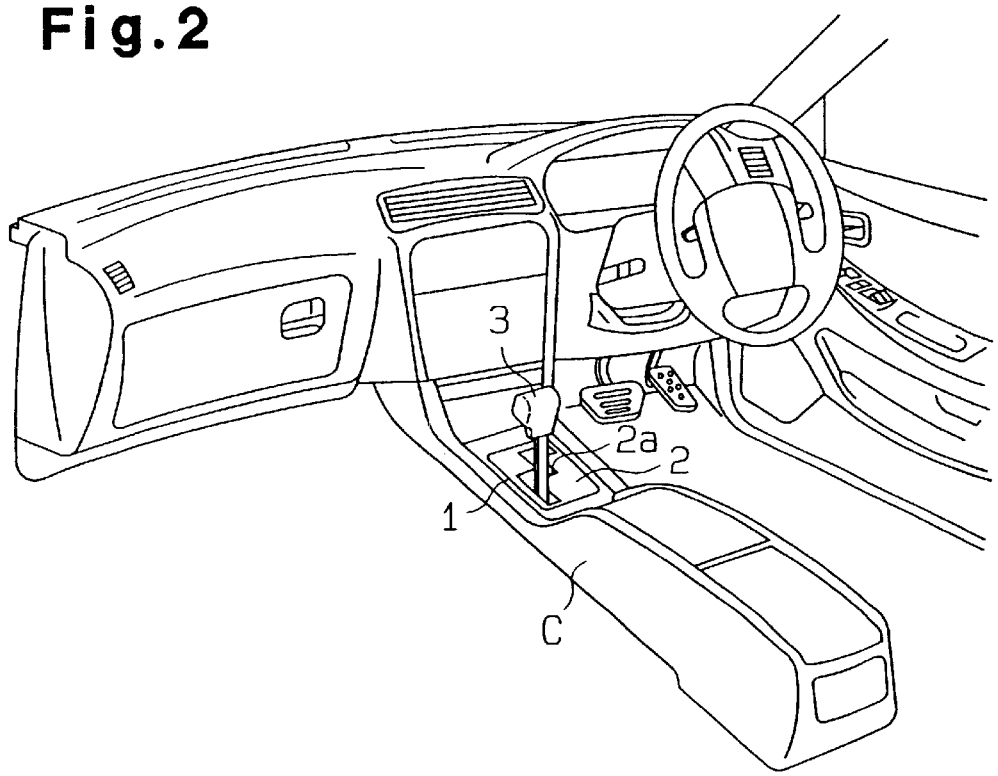
FIG. 2 is a schematic perspective view of the shift lock device shown in FIG. 1.

A shift lock device according to a first embodiment of the present invention will now be described in accordance with FIGS. 1 to 4. As shown in FIG. 2, a shift lock device 1 is arranged on a floor console C. As shown in FIG. 1, the shift lock device 1 is provided with a fixed plate 2 and a restriction plate (movable plate) 4 positioned below the fixed plate 2. The two ends of the restriction plate 4 in the longitudinal direction (front and rear directions) of the restriction plate 4 are engaged with guide grooves (not shown) such that the restriction plate 4 slides in a lateral direction. In FIG. 1, in order to simplify the description, the fixed plate 2 and the restriction plate 4 are shown separated from each other.

A shift gate 2a is formed in the fixed plate 2, and a gate 4a that corresponds to the shift gate 2a is formed in the restriction plate 4. A shift lever 3 is movably arranged in the shift gate 2a and the gate 4a. Letters (P, R, N, D) indicating selection positions are marked in the vicinity of the shift gate 2a. D indicates the drive position, N indicates the neutral position, R indicates the reverse position, and P indicates the park position. FIG. 1 shows a state in which the shift lever 3 is arranged at the drive position D.

The shift gate 2a has a linear opening 30, which enables the shift lever to move from the drive position D to the neutral position N, and a crank-shaped opening 31, which is formed continuously from the linear opening 30 and enables the shift lever 3 to move from the neutral position N to the reverse position R and from the reverse position R to the park position P. The gate 4a has a crank-shaped opening 41, which corresponds to the crank-shaped opening 31 of the shift gate 2a, and a wide opening 40, which is formed continuously from the crank-shaped opening 41 and has a width that is greater than the width of the linear opening 30 of the shift gate 2a. That is, the width of the wide opening 40 is two times or greater than the width of the linear opening 30.

A solenoid 5 serving as an actuator is arranged near the central portion between the drive position D and neutral position N of the restriction plate 4. A plunger 5a of the solenoid 5 is connected to a side end of the restriction plate 4. The restriction plate 4 is moved by the extension and retraction of the plunger 5a of the solenoid 5 between a first position, at which movement of the shift lever 3 to any position is allowed, and a second position, at which the movement of the shift lever 3 is restricted. When an exciting signal is provided to the solenoid 5 from a shift-by-wire (SBW)-ECU 7 (see FIG. 3), the plunger 5a retracts and moves the restriction plate 4 to the first position. When a de-exciting signal is provided to the solenoid 5 from the SBW-ECU 7, the plunger 5a extends and moves the restriction plate 4 to the second position.

Figure 4A:
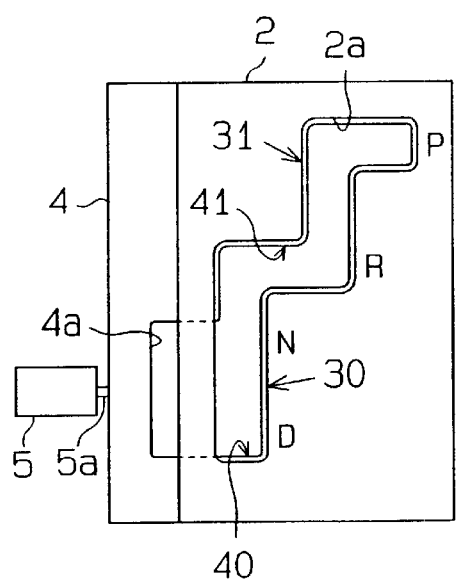
FIG. 4(a) is a plan view showing a state in which a restriction plate of the shift lock device of FIG. 1 is arranged at a first position.
Figure 4B:
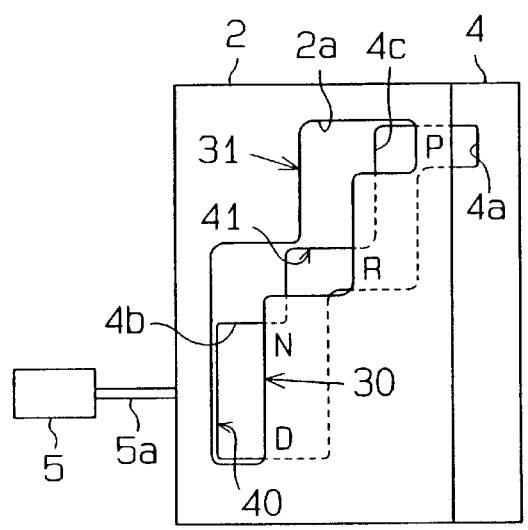
FIG. 4(b) is a plan view showing a state in which the restriction plate is arranged at a second position.

As shown in FIG. 4(a), when the restriction plate 4 is moved to the first position, the shift gate 2a and the gate 4a overlap in all of the selection positions, and movement of the shift lever 3 to all of the selection positions is allowed. As shown in FIG. 4(b), when the restriction plate 4 is moved to the second position, movement of the shift lever 3 between the neutral position N and the drive position D is allowed, while shifting operations from the reverse position R and the park position P are prohibited. That is, in the second position, a first restriction portion 4b, which allows movement of the shift lever 3 between the neutral position N and the drive position D, is defined by the linear opening 30 of the shift gate 2a and part of the wide opening 40 of the gate 4a, and a second restriction portion 4c, which holds the shift lever 3 in the park position P, is defined by part of the crank-shaped opening 31 of the shift gate 2a and part of the crank-shaped opening 41 of the gate 4a.

Figure 3:
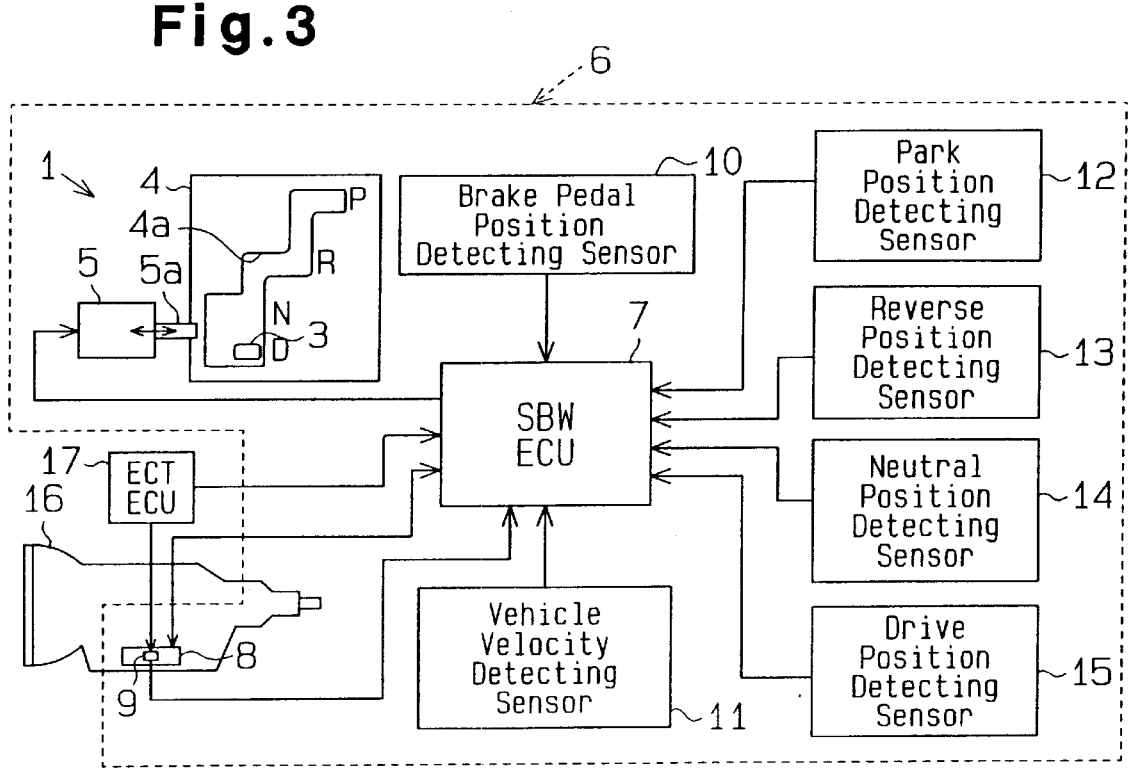
FIG. 3 is a schematic block diagram of a vehicle transmission control apparatus having the shift lock device of FIG. 1.

As shown in FIG. 3, a vehicle transmission control apparatus 6 includes the shift lock device 1, the shift lever 3, the SBW-ECU 7, a gear shifting hydraulic actuator 8, a range position detecting sensor 9, a brake pedal position detecting sensor 10, a vehicle velocity detecting sensor 11, a park position detecting sensor 12, a reverse position detecting sensor 13, a neutral position detecting sensor 14, and a drive position detecting sensor 15. The fixed plate 2, the restriction plate 4, and the solenoid 5 form the shift lock device 1.

The gear shifting hydraulic actuator 8 is an element included in an automatic transmission (referred to below as a transmission) 16 and is provided with electromagnetic control valves (not shown), which are operated by electrical signals. By controlling the supply and discharge of hydraulic fluid from a hydraulic pump using the electromagnetic control valves, the gear train connection state is switched to correspond to the neutral position N, the park position P, the drive position D, and the reverse position R.

The range position detecting sensor 9 is provided in the housing of the transmission 16 and detects the connection state of the gear train to provide a detection signal to the SBW-ECU 7.

The SBW-ECU 7 includes a microcomputer (not shown), which controls the gear shifting hydraulic actuator 8 in accordance with a control program and switches connection states of the gear train. The SBW-ECU 7 controls the gear shifting hydraulic actuator 8 in accordance with operation signals from the shift lock device 1 and detection signals from the range position detecting sensor 9.

The brake pedal position detecting sensor 10 provides a brake signal to the SBW-ECU 7 when the brake pedal is operated by the driver.

The vehicle velocity detecting sensor 11 detects the vehicle velocity and provides a vehicle velocity signal to the SBW-ECU 7. When the SBW-ECU 7 determines that the vehicle velocity is greater than or equal to a predetermined value from the vehicle velocity signal, the SBW-ECU 7 provides a de-exciting signal to the solenoid 5 to extend the plunger 5a and move the restriction plate 4 to the second position. In this manner, the restriction plate 4 is held in the second position. That is, when the connection state of the transmission 16 corresponds to the drive position D and the vehicle velocity is greater that or equal to the predetermined speed, the SBW-ECU 7 provides a de-exciting signal to the solenoid 5 to move the restriction plate 4 to the second position and restrict the movement of the shift lever from the drive position D to the reverse position R.

The operation of the shift lock device 1 will now be described.

When the shift lever 3 is moved to an arbitrary selection position, the corresponding position detecting sensor 12 to 15 provides detection signals to the SBW-ECU 7. In response to that detection signals, the SBW-ECU 7 provides a control signal, which switches the connection state of the transmission 16, to the gear shifting hydraulic actuator 8.

When the vehicle is not moving, the shift lever 3 is in the park position P, the solenoid 5 is de-excited, the restriction plate 4 is held in the second position, and movement of the shift lever 3 from the park position P to another selection position is prohibited. That is, the shift lever 3 is locked.

The shift lever 3 is unlocked in the following manner. Firstly, when the driver depresses the brake pedal, the brake pedal position detecting sensor 10 provides a brake signal to the SBW-ECU 7. Next, when the driver turns on an ignition switch (not shown) using a key, the park position detecting sensor 12 provides a detection signal to the SBW-ECU 7. The SBW-ECU 7 maintains the connection state of the transmission 16 that corresponds to the park position P, while providing an exciting signal to the solenoid 5 in response to the brake signal and the detection signal. Accordingly, as shown in FIG. 4(*a*), the restriction plate 4 is moved to the first position to unlock the shift lever 3. In this manner, the shift lever 3 becomes movable from the park position P to the reverse position R, the neutral position N, or the drive position D.

When the shift lever 3 is moved to the reverse position R, the reverse position detecting sensor 13 provides a detection signal to the SBW-ECU 7 and switches the connection state of the transmission 16 to a connection state corresponding to the reverse position R.

When the shift lever 3 is moved to the neutral position N, the neutral position detecting sensor 14 provides a detection signal to the SBW-ECU 7 and switches the connection state of the transmission 16 to a connection state corresponding to the neutral position N.

When the shift lever 3 is moved to the drive position D, the drive position detecting sensor 15 provides a detection signal to the SBW-ECU 7 and switches the connection state of the transmission 16 to a connection state corresponding to the drive position D.

In the drive position D, when the vehicle velocity exceeds a predetermined value as a result of the depression of the accelerator pedal by the driver, the SBW-ECU 7 provides the de-exciting signal to the solenoid 5 in response to the detection signal from the vehicle velocity detecting sensor 11. As shown in FIG. 4(*b*), this moves the restriction plate 4 to the second position, and the shift lever 3 becomes movable only between the drive position D and the neutral position N. In the drive position D, a transmission electronic control unit (ECT-ECU) 17, which is connected to the SBW-ECU 7, controls connection states of the gear train using a known control method based on the vehicle velocity and throttle opening degree.

When the vehicle stops moving and the driver moves the shift lever 3 from the drive position D to the neutral position N, the neutral position detecting sensor 14 provides a detection signal to the SBW-ECU 7. When determining that the vehicle has stopped based on the detection signal of the vehicle velocity detecting sensor 11, the SBW-ECU 7 provides an exciting signal to the solenoid 5 and, as shown in FIG. 4(*a*), moves the restriction plate 4 to the first position. In this manner, operation for shifting the shift lever 3 to every selection positions is enabled.

If the shift lever 3 is moved to the park position P, the park position detecting sensor 12 provides a detection signal to the SBW-ECU 7. In response to the detection signal, the SBW-ECU 7 switches the connection state of the transmission 16 to a connection state corresponding to the park position P and provides the de-exciting signal to the solenoid 5. In this manner, regardless of the existence of the brake signal from the brake pedal position detecting sensor 10, as shown in FIG. 4(*b*), the restriction plate 4 is moved to the second position. That is, the movement of the shift lever 3 is restricted by the second restriction portion 4c. Thereafter, if the driver removes the key from the engine switch (not shown), the shift lever 3 is maintained in a locked state.

The shift lock device 1 of the present embodiment has the following advantages.

(1) The restriction plate 4 contacts the shift lever 3 and restricts the movement of the shift lever 3. Thus, force produced when operating the shift lever 3 does not act on the solenoid 5. Accordingly, in comparison with an actuator that directly receives the force of a conventional shift lever 3, the solenoid 5 may be reduced in size, and the shift lock device 1 may be reduced in size.

(2) When the vehicle is traveling, the restriction plate 4 is moved to the second position, the movement of the shift lever 3 between the neutral position N and the drive position D is allowed, and movement of the shift lever from the neutral position N to the reverse position R is restricted. Accordingly, even if the driver unintentionally operates the shift lever and moves the shift lever 3 from the drive position D to the neutral position N, the shift lever 3 cannot be moved to the reverse position R. That is, when the vehicle is traveling, the shift lever 3 is prevented from moving from the drive position D to the reverse position R.

(3) A restriction state in which movement of the shift lever 3 between the neutral position N and the drive position D is allowed and a lock state in which the shift lever is held in the park position P are obtained with the single restriction plate 4. Accordingly, the structure of the shift lock device 1 is simplified, and the shift lock device 1 is reduced in size.

(4) Electrical signals are provided to the SBW-ECU 7 when the shift lever 3 is moved to a selection position. Thus, compared with a conventional structure in which a gear is selected mechanically, the structure may be reduced in size.

(5) The crank-shaped portion formed in the shift gate 2a and the restriction plate 4 are used to restrict the shift operation. Thus, the driver recognizes the selection position of the shift lever 3.

It should be apparent to those skilled in the art that the present invention may be embodied in many other specific forms without departing from the spirit or scope of the invention. Particularly, it should be understood that the present invention may be embodied in the following forms.

Figure 5A:
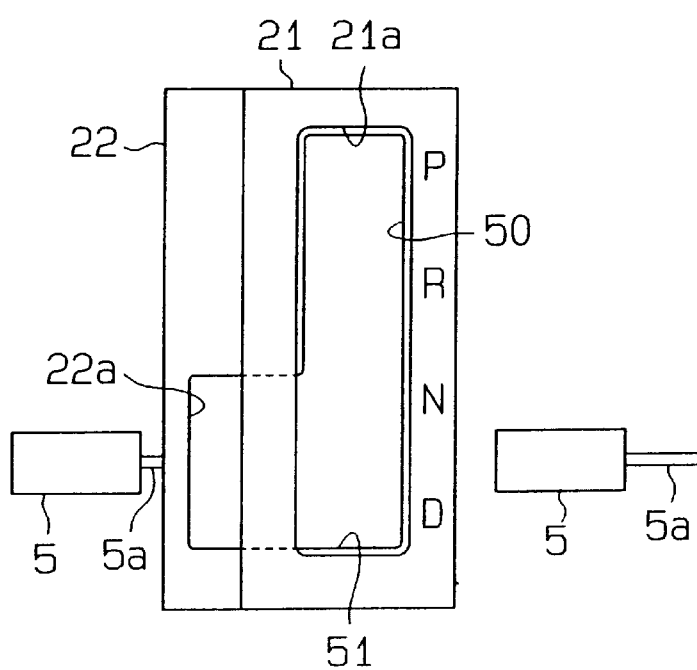
FIG. 5(a) is a plan view showing a state in which a restriction plate of a modification is arranged at a first position.
Figure 5B:
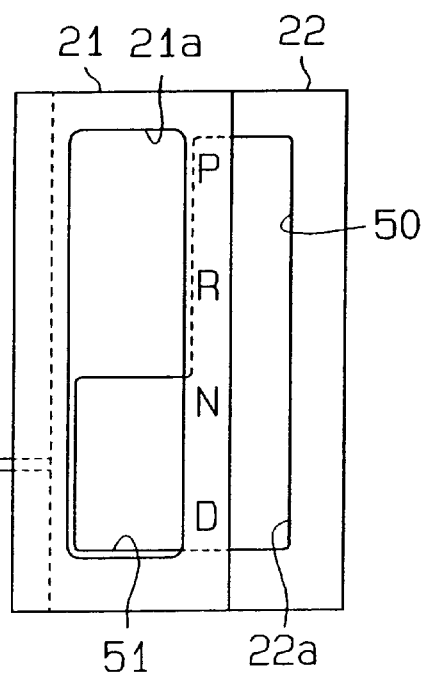
FIG. 5(b) is a plan view showing a state in which the restriction plate is arranged at the second position.

(a) As shown in FIG. 5(*a*), a fixed plate 21 having a linear shift gate 21a may be employed. A gate 22a has a linear portion 50, which corresponds to the linear portion between the park position P and the reverse position R of the shift gate 21a, and a wide portion 51, which corresponds to the linear portion between the neutral position N and the drive position D of the shift gate 21a and which is wider than the linear portion. In this case, when a restriction plate 22 is moved to the first position, the shift gate 21a and the gate 22a overlap, and shift operations are allowed at every selection position. As shown in FIG. 5(*b*), when the restriction plate 4 moves to the second position, movement of the shift lever 3 between the neutral position N and the drive position D is allowed, and movement from the neutral position N to the reverse position R is restricted. The shift gate 21a is easily machined due to its simple shape.

(b) Two or more restriction plates 4 and two or more solenoids 5 may be used.

(c) Instead of the solenoid 5, an actuator such as a motor or an air cylinder may be used.

(d) The shift lock device 1 does not have to be arranged on the floor console C and may be arranged on the instrument panel. The present examples and embodiments are to be considered as illustrative and not restrictive, and the invention is not to be limited to the details given herein, but may be modified within the scope and equivalence of the appended claims.

What is claimed is:

1. A shift lock device for a shift lever that selects shift positions in a shift apparatus used in an automatic transmission of a vehicle, comprising: a fixed plate having a shift gate that allows movement of the shift lever to each of the shift positions; a movable plate facing the fixed plate and being movable in a direction intersecting a moving direction of shift lever, the movable plate having a corresponding gate that has an area greater than the area of the shift gate; and an actuator connected to the movable plate to move the movable plate between a first position and a second position; wherein the corresponding gate of the movable plate allows movement of the shift lever to any shift position at the first position and restricts movement of the shift lever in cooperation with the fixed plate at the second position, wherein the shift gate has a first crank-shaped opening and a first linear opening, which is formed continuously from the first crank-shaped opening, and the corresponding gate has a second crank-shaped opening, which corresponds to the first crank-shaped opening, and a wide opening, which is formed continuously from the second crank-shaved opening and is wider than the first linear opening.

2. The device according to claim 1, wherein the shift positions include a drive position and a neutral position, and in the second position, the first linear opening and part of the wide opening restrict movement of the shift lever between the drive position and the neutral position.

3. The device according to claim 1, wherein the shift positions include a drive position, a neutral position, and a park position, and in the second position, the first linear opening and part of the wide opening define a first restriction portion, which restricts movement of the shift lever between the neutral position and the drive position, and the first and second crank-shaped opening as define a second restriction portion, which locks the shift lever in the park position.

4. The device according to claim 1, wherein the actuator is a solenoid.

5. A shift lock device for a shift lever at selects shift positions in a shift apparatus used in an automatic transmission of a vehicle, comprising:

a fixed plate having a shift gate that allows movement of to shift lever to each of the shift positions;

a movable plate facing the fixed plate and being movable in a direction intersecting a moving direction of shift lever, the movable plate having a corresponding gate that has an area greater than the area of the shift gate; and an actuator connected to the movable plate to move the movable plate between a first position and a second position;

wherein the corresponding gate of the movable plate allows movement of the shift lever to any shift position at the first position and restricts movement of the shift lever in cooperation with the fixed plate at the second position wherein the shift gate has a first linear opening, and the corresponding gate has a second linear opening, which corresponds to part of the first linear opening, and has a wide opening, which is formed continuously from the second linear opening and is wider than the second linear opening.

6. The device according to claim 5, wherein the shift positions include a drive position and a neutral position, and in the second position, part of the first linear opening and part of the wide opening restrict movement of the shift lever between the drive position and the neutral position.

7. The device according to claim 5, wherein the actuator is a solenoid.

8. A shift lock device for a shift lever that selects shift positions including a park position, a neutral position, and a drive position in a shift apparatus used in an automatic transmission of a vehicle, comprising: a fixed plate including a shift gate that allows movement of the shift lever to each of the shift positions, the shift gate having a first crank-shaped opening, which corresponds to the park position, and a linear opening, which corresponds to the neutral position and the drive position and which is formed continuously from the first crank-shaped opening; a movable plate facing the fixed plate and being movable in a direction intersecting a direction in which the shift lever moves, wherein the movable plate includes a first crank-shaped opening and a corresponding gate, which is formed continuously from the first crank-shaped opening and is wider than the linear opening; and an actuator connected to the movable plate to move the movable plate between a first position and a second position; wherein the corresponding gate of the movable plate allows movement of the shift lever to any shift position at the first position, and at to second position, the first and second crank-shaped openings lock the shift lever in the park position, and the linear opening and part of the wide opening restrict movement of the shift lever between the drive position and the neutral position.

9. The device according to claim 6, wherein the width of the wide opening is two or more times the width of the linear opening.

10. The device according to claim 6, wherein the actuator is a solenoid.

* * * * *